Patented Mar. 8, 1949

2,464,033

UNITED STATES PATENT OFFICE 2,464,033

PREPARATION OF DIALKYL-SUBSTITUTED DIHALOGENOSILANES

William F. Gilliam, Schenectady, N. Y., assignor to General Electric Company, a corporation of New York No Drawing. Application February 27, 1947, Serial No. 731,417

14 Claims. (Cl. 260—448.2)

This invention relates to the preparation of organo-halogenosilanes. More particularly, the invention relates to a method for obtaining increased yields of dialkyldihalogenosilanes, especially lower dialkyldihalogenosilanes, which method comprises effecting reaction between an alkyl halide and the silicon component of a mass comprising (1) silicon, (2) a catalyst for the reaction comprising a member selected from the class consisting of copper, halides of copper, oxides of copper, and mixtures of two or more of the three foregoing members, and (3) a promoter for the catalyst selected from the class consisting of zinc, halides of zinc, and mixtures thereof, for example, mixtures of zinc and zinc halides, mixtures of zinc halides, etc., the catalyst, expressed in terms of copper, and the promoter, expressed in terms of zinc, being present, by weight, in an amount equal to from about 2 to 50 per cent in the case of the former, and less than one per cent in the case of the latter, the per cent, by weight, of the catalyst and promoter being based on the total weight of silicon, the catalyst expressed in terms of copper, and the promoter expressed in terms of zinc.

The term "catalyst" as used in the description of this invention and in the appended claims is intended to refer to copper, or copper halides, or oxides of copper, or mixtures thereof. The per cent, by weight, catalyst is intended to mean the per cent of elemental copper or the per cent of copper present as a halide or oxide of copper. For instance, in the case of a halide of copper, the per cent, by weight, of copper contained in the mixture of silicon and the copper halide is based solely upon the silicon and copper contents of the mixture and neglecting the weight of the halogen present. For example, a mixture of 20 grams copper and 180 grams silicon is expressed as 10% Cu–90% Si.

Where, for example, silicon is employed with a catalyst comprising cupric chloride ($CuCl_2$), and the respective amounts present in the mixture of silicon and cupric chloride are 180 grams of the former and 42.3 grams of the latter, the composition of the mixture of ingredients is expressed as follows: 10% Cu (as $CuCl_2$)–90% Si. This composition is obtained by calculating the weight of copper (that is, 20 grams) contained in 42.3 grams of cupric chloride and then expressing this weight of copper (present as cupric chloride) as a per cent, by weight, based solely upon the total weight of the silicon and copper calculated as present in the cupric chloride. The per cent, by weight, of silicon is based on the total weight of silicon and copper calculated as present in cupric chloride; the weight of the halogen is not taken into consideration in calculating the per cents, by weight, of copper and of silicon.

The calculation of the copper in a catalyst comprising an oxide of copper is performed in the same manner as is done in the case of a halide of copper with the exception that the weight of the oxygen is neglected in the oxide of copper in the same way that the weight of the halogen is neglected in the halide of copper.

The term "promoter" as employed in the description of this invention and in the appended claims is intended to refer to zinc, or zinc halides, or mixtures of two or more members of the class. The per cent, by weight, promoter, which is intended to mean the per cent of elemental zinc or the per cent of zinc present as a halide of zinc, is based on the total weight of silicon, copper (either elemental or that present in the copper halide) and zinc (either elemental or that present in the zinc halide), neglecting the weight of the halogen present, if any, in the zinc halide or copper halide.

For example, a mixture of 180 grams silicon, 20 grams copper, and 0.10 gram zinc is expressed as 9.995% Cu–0.05% Zn–89.955% Si. A mixture of 180 grams silicon, 20 grams copper, and 0.4173 grams zinc chloride is expressed as 9.9% Cu–0.1% Zn (as $ZnCl_2$)–89.91% Si. This latter calculation is obtained by determining the weight of zinc (that is, approximately 0.2 gram) contained in 0.4173 gram zinc chloride and then expressing this weight of zinc (present as zinc chloride) as a per cent, by weight, based solely upon the total weight of the silicon, copper, and zinc calculated as present in the zinc chloride; the weight of the halogen is not taken into consideration in calculating the per cents, by weight, of copper, silicon and zinc. The silicon and copper are each calculated on the total weight of these ingredients plus elemental zinc or zinc, present in the zinc halide.

In Rochow Patent 2,380,995, in Rochow and Patnode Patent 2,380,996, and in Rochow and Gilliam Patent 2,383,818, all of which patents are assigned to the same assignee as the present application, there are disclosed and claimed methods for preparing organohalogenosilanes, more particularly hydrocarbon-substituted halogenosilanes, which methods broadly comprise effecting reaction between silicon and a hydrocarbon halide. In the more specific embodiments of the above patented inventions, the hydrocarbon halide is caused to react with the silicon component of a contact mass containing a metallic catalyst for the reaction, for instance, copper.

In the copending application of Dallas T. Hurd, Serial No. 582,997, filed March 15, 1945, now U. S. Patent 2,427,605, issued September 16, 1947, and assigned to the same assignee as the present invention, there is disclosed and claimed a method of preparing increased yields of trialkylhalogenosilanes, for example, trimethylchlorosilane, which method comprises effecting reaction between heated silicon and a lower alkyl halide, for instance, methyl chloride, in the presence of a metal selected from the group consisting of aluminum and zinc. The aluminum and zinc employed in the practice of this invention function as chemical reagents rather than as catalysts for the preparation of the trialkylhalogenosilanes.

The present invention differs from the invention disclosed and claimed in the aforementioned patents in that my method results in the preparation of substantially increased amounts of the dialkyl-substituted dihalogenosilanes by effecting reaction between an alkyl halide and the silicon component of a contact mass containing a catalyst and promoter of the types disclosed in the first paragraph of this specification. Moreover, the invention disclosed herein is further distinguished from that disclosed and claimed in the Hurd application by the fact that I employ much smaller proportions of the promoter for the catalysts employed in effecting reaction between the silicon and alkyl halide, the said promoters being present in an amount equal to less than 1 per cent, by weight, of the total weight of the silicon catalyst, and promoter. In contrast thereto, Hurd discloses the use of substantially greater amounts of zinc than that employed in my claimed invention.

In addition, although the yield of trialkylhalogenosilane is improved when the larger amounts of zinc or aluminum, as taught by Hurd, are employed in effecting the reaction between silicon and the alkyl halide in the presence of, for example, copper, there is a decrease in the yield of the dialkyldihalogenosilane. In contrast to this, when, as I have discovered, the promoters of the type employed in the practice of my invention are present in an amount equal to less than 1 per cent, by weight, of the total weight of the silicon, catalyst and promoter, at most only a trace of the trialkylhalogenosilane is obtained. However, the yield of dialkylhihalogenosilane obtained is materially greater than has heretofore been possible by the reaction between silicon and an alkyl halide in the presence of, e. g., copper or a copper halide, and greatly surpasses the amounts of dialkyldihalogenosilane obtained in accordance with the disclosures and teachings of the aforementioned Hurd application.

Dialkyldihalogenosilanes, for example, dimethyldichlorosilane, are important intermediates in the preparation of various silicone resins, oils, greases, etc. Although the yields of the dialkyldihalogenosilanes have been substantial as a result of the direct synthesis disclosed and claimed in the aforementioned Rochow patent, constant effort has been expended to improve these yields so as to effect a more efficient utilization of the silicon and alkyl halide to direct the consumption of these components to the more exclusive preparation of dialkyldihalogenosilanes. One of the main objects of this invention, therefore, is to obtain consistently greater yields of dialkyldihalogenosilanes than has heretofore been possible by previously known methods.

In accordance with my invention, I have discovered that from substantial to marked increases in the yields of the dialkyldihalogenosilane can be obtained if the reaction between the heated silicon and alkyl halide is effected in the presence of a mixture of ingredients comprising (1) a catalyst for the reaction selected from the class consisting of copper, halides of copper, for example, cupric chloride, oxides of copper and mixtures of two or more of the aforementioned members of the class, and (2) a promoter for the catalyst (i. e., a material capable of accelerating the activity of the catalyst as regards the rate of production and type of product produced) selected from the class consisting of zinc, halides of zinc, for example, zinc chloride and mixtures thereof, the catalyst, expressed in terms of copper, being present, by weight, in an amount equal to from about 2 to 50 per cent, and the promoter, expressed as zinc, being present, by weight, in an amount less than 1 per cent, both catalyst and promoter being based on the total weight of silicon, catalyst (expressed as copper) and the promoter (expressed as zinc).

In the case of the catalyst, optimum results are obtained if the catalyst (expressed in terms of copper) is present, by weight, in an amount equal to from about 5 to 20 per cent, preferably from about 8 to 15 per cent. In the case of the promoter, good results are obtained if the promoter, expressed in terms of zinc, is present, by weight, in an amount equal to from about 0.03 to less than 0.75 per cent, preferably from about 0.05 to 0.5 per cent.

It was quite surprising and unexpected to find that these small amounts of the aforementioned class of promoters employed with the catalyst resulted in better yields than when the promoters were absent, especially since it was known from the work done by Hurd (supra) that lower yields of the dialkyldihalogenosilanes were obtained when zinc or aluminum was employed in an amount substantially above 1 per cent, by weight, of the silicon. It was more surprising to find that the promoter effect was specific for zinc, zinc halides, mixtures of zinc and zinc halides, and mixtures of zinc halides, since other metals and metallic compounds, for example, cobalt, nickel, cadmium, tin, or aluminum chloride, or even zinc oxide, either were only slightly effective or else actually caused a decrease in the yield of the dialkyldihalogenosilane.

The manner in which the silicon, catalyst, and promoter may be present in the reaction chamber is not critical. Thus, for example, the silicon, catalyst, and promoter may be present in the form of a mixture of powders of the individual components, or the promoter and catalyst may be alloyed, where possible, powdered and thereafter mixed with the silicon, preferably in the form of a finely divided powder to give a substantially homogeneous mixture. A further modification, which is included within the scope of my invention, is to alloy or sinter the silicon and the catalyst, where possible, in accordance with the method disclosed and claimed in the aforementioned Rochow and Patnode patent, thereafter comminuting the said alloy and mixing the comminuted alloy with the required amount of promoter. Under certain conditions it may be desirable to use an alloy of silicon and the requisite amount of promoter and mixing this powdered alloy with the catalyst. Other forms of the contact mass over which the alkyl halide is passed will be apparent to persons skilled in the art.

In order that those skilled in the art may better understand how the present invention may be practiced, the following examples are given by way of illustration and not by way of limitation. The alkyl halide employed in each instance was methyl chloride.

With the exception of the zinc halides, which were slightly larger in size, the particle size of the catalyst, for example, the copper or cupric chloride, or the particle size of the zinc, was less than 44 microns in diameter, i. e., substantially all the catalyst and zinc powders passed through a U. S. Standard sieve No. 325. Essentially all the silicon powder used in the reaction was capable of passing through a U. S. Standard sieve No. 100, i. e., substantially all the silicon particles were smaller than 149 microns. It is desirable, though no such limitation is intended to be placed on my claimed invention, that the silicon, catalyst and promoter be present in a suitably comminuted form.

The reaction in each example was effected in the same manner with the exception of those examples which are more particularly explained in the tables which follow. In each case, the silicon, catalyst and promoter (each component being in the form of a finely divided powder) were mixed together to form a homogeneous mixture and the mixture of powders was charged to a U-shaped tubular steel reactor, ¾ inch in diameter. The reactor, with its charge, was purged with methyl chloride and then placed in a molten salt bath at the stated starting temperature, usually 300° C. The flow of the methyl chloride gas was adjusted as closely as possible to 5 grams per hour, and the products, comprising essentially the methylchlorosilanes, which issued from the exit end of the tube were condensed at a temperature of −18° to −20° C. and analyzed. Under these conditions, negligible amounts of unreacted methyl chloride (B. P. −23.7° C.) would be present in the reaction product.

Most of the runs were conducted within the temperature range of 300° to 400° C. These runs were started at 300° C. (or at 275° C. as the case may be) and after the rate of the product obtained fell below 1.5 cc. per hour for a 12-hour period, the temperature of the bath was increased to 325° C. This procedure was continued at intervals of 25° C. until a maximum temperature of 400° C. was attained. At this point, the run was discontinued when the product rate fell below 1 cc. per hour. Where the rate of product was maintained at a high level, only one or two 25° C. increases in temperature were required in many instances to effect practically quantitative utilization of the silicon in the reaction chamber.

During the earlier phases of any of the runs in which reaction is effected between the alkyl halide and the silicon component of the contact mass (i. e., the contact mass comprising the silicon, catalyst and promoter), the amount of dialkyldihalogenosilane in the condensation product may range anywhere from about 35 to 80 per cent, by weight, of the total weight of the product obtained up to that time. Generally, in the type of reaction disclosed above, the proportion, by weight, of the dialkyldihalogenosilane decreases as the silicon component of the contact mass is consumed. It is, therefore, essential that to evaluate properly the effects of a certain mixture of ingredients, due consideration be given to the overall picture. This may require that the per cent of the dialkyldihalogenosilane obtained in the condensed product at the end of a run be properly correlated with the actual amount, by weight, of this compound in the condensed product, the time required to obtain this amount of the compound, the actual per cent of silicon utilized in the preparation of the compound, etc.

EXAMPLE 1

In this example, methyl chloride was passed over heated silicon in the presence of a catalyst for the reaction comprising essentially cupric chloride and a promoter for the catalyst comprising zinc. In the following table, instead of listing the cupric chloride as such, it is listed as per cent copper present as cupric chloride. For example, "10% Cu (as CuCl$_2$)" means that 42.3 grams cupric chloride was employed in the reaction, which, in terms of pure copper, is equivalent to using approximately 20 grams copper. Table 1 shows the different proportions of silicon, cupric chloride, and zinc employed in the reaction.

Table 1

| Sample No. | Grams Silicon | Grams Cupric Chloride | Grams Zinc | Total Powder Compositions |
|---|---|---|---|---|
| 1 | 180 | 42.3 | 0.0 | 10% Cu (as CuCl$_2$), 90% Si. |
| 2 | 180 | 42.3 | 1.0 | 9.95% Cu (as CuCl$_2$), 0.5% Zn, 89.55% Si. |
| 3 | 180 | 84.6 | 0.0 | 18.18% Cu (as CuCl$_2$), 81.82% Si. |
| 4 | 180 | 84.6 | 0.4008 | 18.15% Cu (as CuCl$_2$), 0.182% Zn, 81.68% Si. |
| 5 | 180 | 84.6 | 0.8032 | 18.116% Cu (as CuCl$_2$), 0.364% Zn, 81.52% Si. |

Table 2 shows the conditions of reaction used for each example. The heading "Grams weight of reaction product" is intended to include the entire product obtained by condensing, at about −18° to −20° C., the effluent gases resulting from the reaction between the methyl chloride and the silicon.

Table 2

| Sample No. | Length of Run Hours | Gram Weight of Input CH$_3$Cl | Gram Weight of Reaction Product | Bath Temperature, °C. |
|---|---|---|---|---|
| 1 | 402 | 1,800 | 762 | 300–400 |
| 2 | 256 | 902 | 801 | 300–325 |
| 3 | 378 | 1,759 | 766 | 300–400 |
| 4 | 159 | 1,315 | 790 | 300 |
| 5 | 159 | 783 | 781 | 300 |

Table 3 shows the results of analyzing the reaction product obtained in each example to determine its composition. The amount of each component obtained is expressed in per cent, by weight, of the total weight of the reaction product. The products listed as "Boiling below 66° C." include compounds boiling below methyltrichlorosilane, e. g., methyldichlorosilane ($CH_3SiHCl_2$), silicon tetrachloride (either slight traces or absent), trimethylchlorosilane [$(CH_3)_3SiCl$] (present only as a slight trace in Example 1 and virtually absent in the remaining examples), and negligible amounts of methyl chloride, etc. Dimethyldichlorosilane boiling at 70° C. at atmospheric pressure and methyltrichlorosilane boiling at 66° C. at atmospheric pressure are, therefore, the only products boiling at or above 66° C., exclusive of the amount of material included under the heading "Residue." Thus, the heading "Residue" is intended to refer to those products having a boiling range higher than dimethyldichlorosilane.

finely divided metallic copper. The reference by headings to the contents of Tables 4, 5 and 6 corresponds essentially to the reference by headings to the contents of Tables 1, 2 and 3 in Example 1.

Table 4

| Sample No. | Grams Silicon | Grams Copper | Grams Zinc | Total Powder Compositions |
|---|---|---|---|---|
| 6 | 180 | 20 | 0.0 | 10% Cu, 90% Si. |
| 7 | 180 | 20 | 0.02 | 9.999% Cu, 0.01% Zn, 89.991% Si. |
| 8 | 180 | 20 | 0.10 | 9.995% Cu, 0.05% Zn, 89.955% Si. |
| 9 | 180 | 20 | 0.20 | 9.99% Cu, 0.1% Zn 89.91% Si. |
| 10 | 180 | 20 | 0.6018 | 9.97% Cu, 0.30% Zn, 89.73% Si. |
| 11 | 180 | 19 | 1.0 | 9.5% Cu, 0.5% Zn, 90% Si. |
| 12 | 180 | 20 | 2.0 | 9.9% Cu, 1.0% Zn, 89.1% Si. |
| 13 | 180 | 20 | 7.3 | 9.65% Cu, 3.5% Zn, 86.85% Si. |
| 14 | 90 | 90 | 0.0 | 50% Cu, 50% Si. |
| 15 | 90 | 90 | 0.1802 | 49.95% Cu, 0.1% Zn, 49.95% Si. |
| 16 [1] | 180 | 19 | 1.00 | 9.5% Cu, 0.5% Zn, 90% Si. |
| 17 [1] | 180 | 19 | 1.00 | 9.5% Cu, 0.5% Zn, 90% Si. |

[1] In these samples the copper and zinc were in the form of a powdered alloy consisting essentially of 95% copper and 5% zinc, 20 grams of the alloy being used in each case.

Table 3

| Sample No. | Per Cent By Weight of the Reaction Product* | | | | $I_D$ Per Cent Si Converted to $(CH_3)_2SiCl_2$** | Weight $(CH_3)_2SiCl_2$ |
|---|---|---|---|---|---|---|
| | Boiling Below 66° C. | $CH_3SiCl_3$ | $(CH_3)_2SiCl_2$ | Residue | | |
| | | | | | | Grams |
| 1 | 19.7 | 22.5 | 47.3 | 6.3 | 44.3 | 360 |
| 2 | 9.6 | 16.0 | 65.2 | 6.5 | 64.0 | 522 |
| 3 | 19.8 | 20.4 | 50.4 | 6.4 | 47.5 | 386 |
| 4 | 12.1 | 13.4 | 66.3 | 3.6 | 64.4 | 524 |
| 5 | 13.1 | 15.8 | 63.5 | 4.4 | 61.0 | 497 |

*The total per cent of the reaction product is not equal to 100 per cent in the above tests because of slight experimental errors and certain unpreventable handling losses.
**The values under this heading correspond to the approximate per cent, by weight, of silicon converted to dimethyldichlorosilane in accordance with the following formula:

$$\frac{\text{Weight of Dimethyldichlorosilane} \times \frac{\text{Atomic Weight of Silicon}}{\text{Mol. Wt. Dimethyldichlorosilane}}}{\text{Weight of Silicon Charged to Reactor}} \times 100$$

From the results of the foregoing example, it is apparent that by employing a promoter, for example, zinc, for a catalyst, more specifically, cupric chloride, the weights of the catalyst and promoter being within the limits of my claimed invention, it is possible to obtain greater yields of the more desirable dimethyldichlorosilane than is possible when the said promoter is absent. Not only are increased yields of dimethyldichlorosilane obtainable, but also the time within which the dimethyldichlorosilane is obtained and the rate at which the compound is formed is much greater in the case where the promoter is employed than where it is absent.

EXAMPLE 2

This example illustrates the use of zinc as a promoter for a catalyst comprising essentially Table 5

| Sample No. | Length of Run, Hours | Gram Weight of Input $CH_3Cl$ | Gram Weight of Reaction Product | Bath Temperature, °C. |
|---|---|---|---|---|
| 6 | 372 | 1,942 | 744 | 300–400 |
| 7 | 350 | 2,825 | 704 | 300–400 |
| 8 | 350 | 1,518 | 804 | 300–400 |
| 9 | 352 | 1,816 | 815 | 300–400 |
| 10 | 308 | 1,610 | 795 | 300–400 |
| 11 | 262 | 1,290 | 800 | 300 |
| 12 | 327 | 1,620 | 798 | 300–375 |
| 13 | 255 | 1,396 | 896 | 300 |
| 14 | 306 | 1,695 | 354 | 300–400 |
| 15 | 306 | 1,765 | 376 | 300–400 |
| 16 | 237 | 1,313 | 797 | 300 |
| 17 | 379 | 1,224 | 790 | 275–325 |

Table 6

| Sample No. | Per Cent By Weight of Reaction Product | | | | $I_D$ Per Cent Si Converted to $(CH_3)_2SiCl_2$* | Weight $(CH_3)_2SiCl_2$ |
|---|---|---|---|---|---|---|
| | Boiling Below 66° C. | $CH_3SiCl_3$ | $(CH_3)_2SiCl_2$ | Residue | | |
| | | | | | | Grams |
| 6 | 18.4 | 18.9 | 54.8 | 4.3 | 50.0 | 408 |
| 7 | 19.9 | 16.0 | 56.6 | 1.9 | 48.9 | 398 |
| 8 | 16.2 | 12.8 | 64.0 | 2.1 | 63.0 | 514 |
| 9 | 15.3 | 16.4 | 63.6 | 1.8 | 63.5 | 517 |
| 10 | 16.1 | 16.1 | 59.9 | 3.9 | 58.5 | 476 |
| 11 | 14.6 | 15.6 | 62.2 | 3.6 | 61.1 | 498 |
| 12 | 16.7 | 27.5 | 48.7 | 5.6 | 47.7 | 389 |
| 13 | 17.5 | 48.0 | 22.5 | 6.6 | 24.7 | 202 |
| 14 | 27.0 | 28.2 | 33.3 | 7.9 | 28.9 | 118 |
| 15 | 20.9 | 31.0 | 41.4 | -------- | 38.2 | 155 |
| 16 | 13.4 | 19.7 | 58.7 | 3.2 | 57.3 | 468 |
| 17 | 13.1 | 19.9 | 59.4 | 3.4 | 57.6 | 470 |

*See Table 3 for the explanation of this heading.

EXAMPLE 3

In this example, the contact mass over which the methyl chloride was passed comprised a homogeneous mixture of powders of silicon powder, copper powder, and zinc chloride powder, the latter powder being employed as a promoter for the copper. Tables 7, 8 and 9 show the compositions of the powder mixtures, the conditions of reaction, and the analyses of the reaction products, respectively. The results shown in this example are to be compared with control Sample 6 in Example 2 where zinc chloride was absent.

*Table 7*

| Sample No. | Grams Silicon | Grams Copper | Grams Zinc Chloride | Total Powder Compositions |
|---|---|---|---|---|
| 18 | 180 | 20 | 0.2085 | 9.995% Cu, 0.05% Zn (as $ZnCl_2$), 89.955% Si. |
| 19 | 180 | 20 | 0.4173 | 9.99% Cu, 0.1% Zn (as $ZnCl_2$), 89.91% Si. |

*Table 8*

| Sample No. | Length of Run, Hours | Gram Weight of Input $CH_3Cl$ | Gram Weight of Reaction Product | Bath Temperature, °C. |
|---|---|---|---|---|
| 18 | 327 | 1,665 | 795 | 1 300–325 |
| 19 | 327 | 1,404 | 854 | 1 300–325 |

1 The rate of reaction in these two samples was so fast that practically 100% silicon utilization or consumption occurred when the temperature reached 325° C. It was, therefore, not necessary to raise the temperature any higher than 325° C.

*Table 9*

| Sample No. | Per Cent By Weight of the Reaction Product | | | | $I_D$ Per Cent Si Converted to $(CH_3)_2SiCl_2$ * | Weight $(CH_3)_2SiCl_2$ |
|---|---|---|---|---|---|---|
| | Boiling Below 66° C. | $CH_3SiCl_3$ | $(CH_3)_2SiCl_2$ | Residue | | |
| | | | | | | Grams |
| 18 | 15.9 | 14.9 | 63.8 | 4.1 | 62.9 | 507 |
| 19 | 12.5 | 16.7 | 63.5 | 3.1 | 66.6 | 542 |

*See Table 3 for the explanation of this heading.

EXAMPLE 4

In this example, under similar conditions of reaction as employed in the foregoing examples, when methyl chloride was passed over a silicon contact mass consisting essentially of 9.985% Cu–0.15% Zn (as $ZnBr_2$)–89.865% Si, an increase of about 25 per cent in the yield of dimethyldichlorosilane was obtained as compared to the yield of dimethyldichlorosilane realized when the zinc bromide was absent.

EXAMPLE 5

Using similar conditions of reaction as employed in the foregoing examples, when methyl chloride was passed over contact masses of silicon, cupric chloride and zinc chloride in the per cents, by weight, as follows:

(a) 9.995% Cu (as $CuCl_2$)–0.05% Zn (as $ZnCl_2$)–89.955% Si
(b) 9.99% Cu (as $CuCl_2$)–0.1% Zn (as $ZnCl_2$)–89.91% Si there was obtained in both cases an increase of 20 per cent or more in the yield of dimethyldichlorosilane as compared to the yield of dimethyldichlorosilane obtained where the zinc chloride was absent.

EXAMPLE 6

In this example, under conditions of reaction similar to those employed in the foregoing examples, when methyl chloride was passed over a contact mass consisting essentially, by weight, of 9.99% Cu (as $Cu_2O$)–0.1% Zn (as $ZnCl_2$)–89.91% Si, an increase of greater than 25 per cent in the yield of dimethyldichlorosilane was obtained as compared to the yield of dimethyldichlorosilane obtained when the zinc as zinc chloride was absent.

When 9.99% Cu (as CuO) was substituted in place of the 9.99% Cu (as $Cu_2O$) employed above, the increase in the yield of dimethyldichlorosilane was greater than 30 per cent of that obtained when the zinc as zinc chloride was absent.

It is to be understood that the scope of my invention is not limited to the specific alkyl halide used in the above illustrative examples and that other alkyl halides, especially lower alkyl halides, for example, methyl bromide, ethyl chloride, ethyl bromide, propyl chloride, isopropyl chloride, butyl chloride, etc., or mixtures of alkyl halides may be employed as a reactant with the silicon, the conditions of reaction generally being varied depending upon the particular alkyl halide, the type of reactor employed, etc. In general, the vapor phase reactions are preferred because they can be carried out more economically, may be controlled more easily, and render themselves more easily to a continuous process of manufacture.

Likewise, the invention is not limited to the specific temperatures or temperature ranges mentioned in the examples. However, the reaction temperature should not be so high as to cause extensive deposition of carbon upon the unreacted silicon. In general, the reaction temperature to be used will vary with, for instance, the particular alkyl halide employed, the particular catalyst or promoter used, etc. At temperatures of the order of 200° C., the reaction proceeds much more slowly than at reaction temperatures around 250° to 400° C. At temperatures much above 400° C., in the case of methyl chloride, for example, there is a vigorous exothermic reaction which generally results in an undesirable deposition of carbon in the reaction tube. Optimum results usually are obtained within the more limited range of 250° to 400° C.

It also will be understood by those skilled in the art that catalysts and promoters other than those employed in the foregoing examples may be used in my claimed invention without departing from the scope of the said invention. Examples of such catalysts, in addition to copper, cupric chloride, cuprous oxide, and cupric oxide employed in the foregoing examples, are cupric bromide, cuprous chloride, cuprous bromide, mixtures of copper and copper chloride, etc. Additional examples of promoters which may be employed in addition to the zinc, zinc chloride and zinc bromide used in the foregoing examples, are zinc iodide, mixtures of zinc and zinc chloride, mixtures of zinc chloride and zinc bromide, etc.

As pointed out previously, the copper and silicon may be present in the form of an alloy where, preferably, the alloy consists substantially of a preponderant proportion of silicon and a minor proportion of copper. More specific directions for preparing alloys of this type may be found in the aforementioned patents as well as in Patnode U. S. Patent 2,380,997, issued August 7, 1945, and assigned to the same assignee as the present invention. When using a copper halide as the catalyst for the reaction, the silicon may be admixed with the copper halide and heated at elevated temperatures of the order of from about 200° to 400° C. thereby to obtain a coherent mass comparable in reactivity with the alloy of silicon and copper.

Further modifications of the illustrative examples of my claimed invention are also intended to be embraced within the scope of my invention. For example, the catalyst may comprise a mixture of copper and a copper halide with a promoter containing zinc, or a zinc halide, or a mixture of zinc and a zinc halide, or a mixture of zinc halides. Also, the promoter may comprise a mixture of zinc and a zinc halide with a catalyst comprising essentially copper, or a copper halide, or a copper oxide, or a mixture of copper and a copper halide, or a mixture of copper halides.

The products of this invention have utility as intermediates in the preparation of other products, for instance, they may be employed as starting materials for the manufacture of silicone resins, oils, etc. They may also be used as agents for treating water-non-repellent bodies to make them water-repellent as disclosed and claimed in the patent of Winton I. Patnode, U. S. 2,306,222, issued December 22, 1942, and assigned to the same assignee as the present invention.

It will be apparent to those skilled in the art that in addition to the preparation of dimethyldichlorosilane as disclosed in the foregoing examples, it is also possible by means of my invention to prepare other dialkyldihalogenosilanes, for example, dimethyldibromosilane, diethyldichlorosilane, diethyldibromosilane, dipropyldichlorosilane, diisopropyldichlorosilane, dibutyldibromosilane, etc. My invention is more particularly adapted to the preparation of the lower dialkyldihalogenosilanes as mentioned before.

What I claim as new and desire to secure by Letters Patent of the United States is:

1. The method for obtaining increased yields of dialkyldihalogenosilanes which comprises effecting reaction between a lower alkyl monohalide and the silicon component of a mass comprising (1) silicon, (2) a catalyst for the reaction selected from the class consisting of copper, halides of copper, oxides of copper, and mixtures thereof, and (3) a promoter for the catalyst selected from the class consisting of zinc, halides of zinc, and mixtures thereof, the catalyst expressed in terms of copper, and the promoter, expressed in terms of zinc, being present, by weight, in an amount equal to from about 2 to 50 per cent in the case of the former, and from 0.03 to 0.75 per cent in the case of the latter, the per cent, by weight, of the catalyst and promoter being based on the total weight of silicon, the catalyst expressed in terms of copper, and the promoter expressed in terms of zinc.

2. The method for obtaining increased yields of dimethyldichlorosilane which comprises effecting reaction between heated silicon and methyl chloride in the presence of a mixture of ingredients comprising (1) a catalyst for the reaction selected from the class consisting of copper, halides of copper, oxides of copper, and mixtures thereof, and (2) a promoter for accelerating the catalytic effect of the catalyst selected from the class consisting of zinc, halides of zinc, and mixtures thereof, the catalyst, expressed in terms of copper, and the promoter, expressed in terms of zinc, being present, by weight, in an amount equal to from about 2 to 50 per cent in the case of the former, and from 0.03 to 0.75 per cent in the case of the latter, the per cent, by weight, of the catalyst and promoter being based on the total weight of silicon, the catalyst expressed in terms of copper, and the promoter expressed in terms of zinc.

3. The method for obtaining increased yields of a dialkyldihalogenosilane which comprises effecting reaction between heated silicon and a lower alkyl monohalide in the presence of a mixture of ingredients comprising (1) copper and (2) zinc, the copper and zinc being present, by weight, in an amount equal to from about 2 to 50 per cent in the case of the former, and from 0.03 to 0.75 per cent in the case of the latter, the per cent, by weight, of the copper and zinc being based on the total weight of the silicon, copper, and zinc.

4. The method for obtaining increased yields of a dialkyldihalogenosilane which comprises effecting reaction between heated silicon and a lower alkyl monohalide in the presence of a mixture of ingredients comprising (1) copper and (2) a zinc halide, the copper and the zinc added as zinc halide being present, by weight, in an amount equal to from about 2 to 50 per cent in the case of the copper, and from 0.03 to 0.75 per cent in the case of the zinc added as zinc halide, the per cent, by weight, of copper and zinc added as zinc halide being based on the total weight of the silicon, copper, and zinc halide expressed in terms of zinc.

5. The method as in claim 4 wherein the zinc halide is zinc chloride.

6. The method for obtaining increased yields of a dialkyldihalogenosilane which comprises effecting reaction between heated silicon and a lower alkyl monohalide in the presence of a mixture of ingredients comprising (1) a copper halide and (2) zinc, the copper added as copper halide, and the zinc being present, by weight, in an amount equal to from about 2 to 50 per cent, in the case of the copper added as copper halide, and from 0.03 to 0.75 per cent of the zinc, the per cent, by weight, of the copper added as copper halide and zinc being based on the total weight of the silicon, copper halide expressed in terms of copper, and zinc.

7. The method as in claim 6 wherein the copper halide is cupric chloride.

8. The method for obtaining increased yields of dimethyldichlorosilane which comprises effecting reaction, at an elevated temperature, between silicon and methyl chloride in the presence of a mixture of ingredients comprising copper and zinc, the latter two ingredients being present, by weight, based on the total weight of the silicon, copper, and zinc, in an amount equal to from about 5 to 20 per cent in the case of the copper and from about 0.05 to 0.5 per cent in the case of the zinc.

9. The method for obtaining increased yields of dimethyldichlorosilane which comprises effecting reaction, at an elevated temperature, between silicon and methyl chloride in the presence of a mixture of ingredients comprising copper and zinc chloride, the copper and the zinc added as zinc chloride, being present, by weight, in an amount equal to from about 5 to 20 per cent in the case of the copper, and from about 0.05 to 0.5 per cent in the case of the zinc added as zinc chloride, the per cent, by weight, of the copper and zinc added as zinc chloride being based on the total weight of silicon, copper, and zinc chloride expressed in terms of zinc.

10. The method for obtaining increased yields of dimethyldichlorosilane which comprises effecting reaction, at an elevated temperature between silicon and methyl chloride in the presence of a mixture of ingredients comprising cupric chloride, and zinc, the copper added as cupric chloride, and the zinc being present, by weight, in an amount equal to from approximately 5 to 20 per cent in the case of the copper added as cupric chloride and from approximately 0.05 to 0.5 per cent in the case of the zinc, the per cent, by weight, of the copper added as cupric chloride and zinc being based on the total weight of silicon, cupric chloride expressed in terms of copper, and zinc.

11. In a method for producing dimethyldichlorosilane by effecting reaction, at a temperature of from about 200° to 500° C. between silicon and methyl chloride in the presence of copper as a catalyst for the reaction, the improvement which comprises effecting the reaction in the presence of a mixture of powders comprising the aforementioned copper and a promoter comprising zinc, the percentages, by weight, of the catalyst and promoter, based on the total weight of the silicon, copper, and zinc, being equal to from about 8 to 15 per cent in the case of the copper, and from about 0.05 to 0.5 per cent in the case of the zinc.

12. In a method for producing dimethyldichlorosilane by effecting reaction between silicon and methyl chloride at a temperature of from about 200° to 500° C. in the presence of copper as a catalyst for the reaction, the improvement which comprises effecting the reaction in the presence of a mixture of powders comprising the aforementioned copper and a promoter comprising zinc chloride, the percentages, by weight, of the copper and zinc added as zinc chloride being equal to from about 8 to 15 per cent in the case of the copper and approximately 0.05 to 0.5 per cent in the case of the zinc present in the zinc chloride, the per cent, by weight, of the copper and the zinc added as zinc chloride being based on the total weight of silicon, copper, and zinc chloride expressed in terms of zinc.

13. In a method for producing dimethyldichlorosilane by effecting reaction between silicon and methyl chloride at a temperature of from about 200° to 500° C. in the presence of cupric chloride as a catalyst for the reaction, the improvement which comprises effecting the reaction in the presence of a mixture of powders comprising the aforementioned cupric chloride and a promoter comprising zinc, the percentages, by weight, of the copper added as cupric chloride and the zinc, based on the total weight of the silicon, the cupric chloride expressed in terms of copper, being equal to from about 8 to 15 per cent in the case of the copper added as cupric chloride and approximately 0.05 to 0.5 per cent in the case of the zinc.

14. The method for obtaining increased yields of dimethyldichlorosilane which comprises effecting reaction, at a temperature of from about 300° to 400° C., between silicon and methyl chloride in the presence of a catalyst for the reaction comprising copper and a promoter for the catalyst comprising zinc chloride, the copper being present, by weight, in an amount equal to approximately 10 per cent of the total weight of silicon, copper, and zinc chloride expressed in terms of zinc, and the zinc added as zinc chloride being present, by weight, in an amount equal to from 0.05 to 0.5 per cent of the total weight of silicon, copper, and zinc chloride expressed in terms of zinc.

WILLIAM F. GILLIAM.

REFERENCES CITED

The following references are of record in the file of this patent:

UNITED STATES PATENTS

| Number | Name | Date |
| --- | --- | --- |
| 2,383,818 | Rochow | Aug. 28, 1945 |
| 2,427,605 | Hurd | Sept. 16, 1947 |

Certificate of Correction

Patent No. 2,464,033.  March 8, 1949.

WILLIAM F. GILLIAM

It is hereby certified that errors appear in the printed specification of the above numbered patent requiring correction as follows:

Column 3, line 73, for "dialkylhihalogenosilane" read *dialkyldihalogenosilane*; column 8, line 4, strike out "headings to the contents of Tables 4, 5 and 6 cor-", and insert the same in line 2, before the word "responds"; column 13, line 20, claim 10, after "ride" strike out the comma;

and that the said Letters Patent should be read with these corrections therein that the same may conform to the record of the case in the Patent Office.

Signed and sealed this 22nd day of November, A. D. 1949.

[SEAL]

THOMAS F. MURPHY,
*Assistant Commissioner of Patents.*